United States Patent Office 3,505,241
Patented Apr. 7, 1970

3,505,241
PROCESS FOR PREPARING RARE EARTH VANADATE PHOSPHORS
James E. Mathers, Ulster, Pa., assignor to Sylvania Electric Products Inc., a corporation of Delaware
No Drawing. Filed June 14, 1967, Ser. No. 645,892
Int. Cl. C09k 1/44
U.S. Cl. 252—301.4         7 Claims

ABSTRACT OF THE DISCLOSURE

The luminous efficiency of ultraviolet responsive, rare earth metal (yttrium, gadolinium and/or lutetium) orthovanadate phosphors, generally activated by europium, can be increased by washing the material, after firing, in an acid media. After washing in the acid media, the phosphor is washed to a neutral pH and digested in an alkaline solution, filtered, washed again in water until a neutral pH is reached. The phosphor is then dried.

BACKGROUND OF THE INVENTION

Field of the invention

This invention relates to the manufacture of yttrium orthovanadate phosphors and particularly to improving the luminous efficiency of such materials.

SUMMARY OF THE PRIOR ART

In the past, rare earth metal orthovanadate phosphors have been prepared by mixing raw materials necessary to form the phosphor, such as the oxides, carbonates and/or oxalates of the respective cations, yttrium and europium for example, together with ammonium metavanadate. The mixture was then fired in an oxidizing atmosphere for a sufficient time to react the raw materials and produce yttrium orthovanadate. When cooled, the phosphor was digested in a strong sodium hydroxide solution, then washed in water until a neutral pH was obtained and the product was dried.

SUMMARY OF THE INVENTION

It has been noticed that the phosphor had an off-white body color and it has been discovered that the coloration is due to excess vanadium. It was further discovered that if the phosphor is washed in a mineral acid, followed by washing in water and then in an alkali, that the coloration is eliminated and the luminescent efficiency of the phosphor is increased.

As indicated in the table following, the percent brightness of the phosphor increases at each measurement point when the phosphor irradiated at various points of the ultraviolet spectrum. Sample 1 (a material not washed with an acid and prepared using prior art techniques) was an arbitrary standard and equated at 100. The remainder of the tests were based upon this standard.

TABLE—EFFECT OF ACID WASHING ON UV BRIGHTNESS

| Sample No. | Acid wash | Percent brightness | | | |
|---|---|---|---|---|---|
| | | 254 nm. | 325 nm. | 396 nm. | 466 nm. |
| 1 | No | 100 | 100 | 100 | 100 |
| 2 | Yes | 112 | 111 | 144 | 127 |
| 3 | No | 112 | 114 | 154 | 122 |
| 4 | Yes | 114 | 114 | 179 | 133 |
| 5 | No | 97 | 95 | 65 | 74 |
| 6 | Yes | 110 | 109 | 129 | 115 |
| 7 | No | 96 | 95 | 64 | 78 |
| 8 | Yes | 100 | 98 | 74 | 83 |

DESCRIPTION OF THE PREFERRED EMBODIMENTS

In the manufacture of the material, an yttrium orthovanadate phosphor, preferably activated with europium, and possibly containing other activators such as bismuth, terbium and praseodymium is prepared according to conventional techniques.

The phosphor is then cooled, slurried in a dilute mineral acid solution, such as 5 to 20% (by weight) hydrochloric, nitric and/or phosphoric acid, and digested at an elevated temperature but below the boiling point. Preferably, the phosphor is digested between 50 to 100° C. The phosphor is then washed in deionized water until a neutral pH is reached and then digested in an alkaline solution (5 to 20% by weight) preferably ammonium hydroxide, but stronger bases such as sodium or potassium hydroxide also have applicability. Digesting in a base should be done at an elevated temperature between about 35 to 100° C.

Following digestion in a base, the phosphor is washed in water until a neutral pH is attained and the material is then dried.

As a specific example of my invention, an yttrium orthovanadate phosphor is prepared and then slurried in a 10% hydrochloric acid solution and digested for one hour at about 80° C. The phosphor is then washed to a neutral pH with deionized water after which sufficient ammonium hydroxide is added to give a concentration of 10% by volume. The phosphor is digested in the ammoniacal solution for ½ hour at 50° C., then filtered, washed with deionized water and dried.

As my invention, I claim:

1. In the manufacture of a rare earth metal orthovanadate phosphor which has been prepared by high-temperature-firing of materials necessary to form said phosphor, the steps which comprises: washing in an aqueous mineral acid solution the phosphor which is the product of said high temperature firing; rinsing said phosphor in water and then digesting said phosphor in an aqueous basic solution of ammonium hydrxide or alkali metal hydroxide.

2. The process according to claim 1 wherein the rare earth metal is a member selected from the group consisting of yttrium, lutetium and gadolinium.

3. The process according to claim 2 wherein the product of said digesting in said basic solution is filtered, washed in water and then dried.

4. The process according to claim 3 wherein the washing in an aqueous mineral acid solution occurs at a temperature between about 50 to 100° C.

5. The process according to claim 3 wherein the digesting in a basic solution occurs at a temperature between about 35 to 100° C.

6. The process according to claim 2 wherein the mineral acid is a member selected from the group consisting of hydrochloric, nitric and phosphoric.

7. The process according to claim 5 wherein the basic solution is a member selected from the group consisting of ammonium hydroxide, potassium hydroxide and sodium hydroxide.

References Cited

UNITED STATES PATENTS

| | | | |
|---|---|---|---|
| 3,348,924 | 10/1967 | Levine et al. | 252—301.4 |
| 3,357,925 | 12/1967 | Levine et al. | 252—301.4 |
| 3,360,480 | 12/1967 | Martin et al. | 252—301.4 |
| 3,380,926 | 4/1968 | Harper | 252—301.4 |
| 3,420,860 | 1/1969 | Ropp | 252—301.4 |

HELEN M. McCARTHY, Primary Examiner

R. D. EDMONDS, Assistant Examiner